Feb. 6, 1968   J. J. PELOUCH   3,367,449
VEHICLE LIFT

Filed June 8, 1967   4 Sheets-Sheet 1

INVENTOR.
JAMES J. PELOUCH

Feb. 6, 1968  J. J. PELOUCH  3,367,449
VEHICLE LIFT

Filed June 8, 1967  4 Sheets-Sheet 2

INVENTOR.
JAMES J. PELOUCH

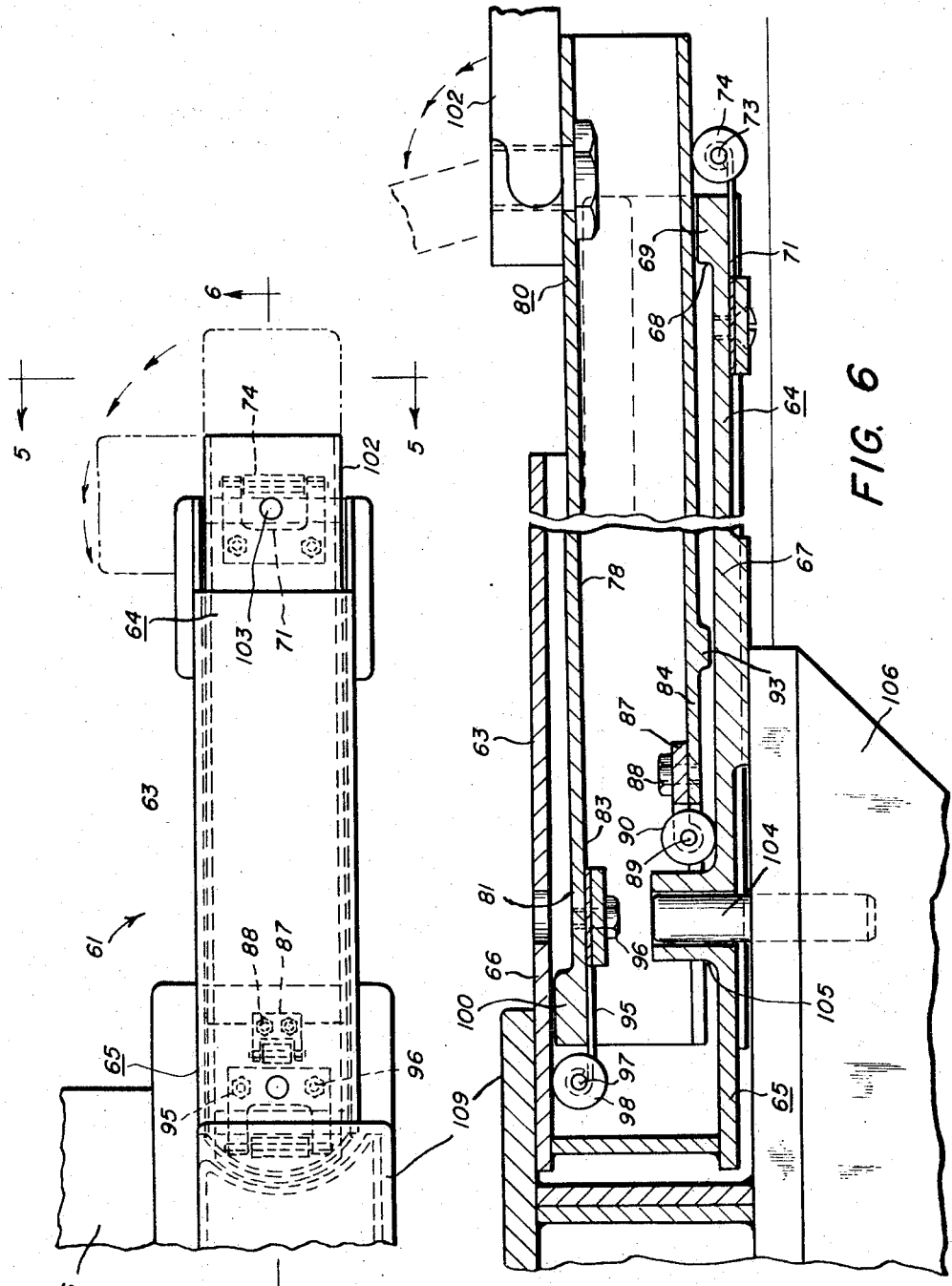

Feb. 6, 1968
J. J. PELOUCH
3,367,449
VEHICLE LIFT
Filed June 8, 1967
4 Sheets-Sheet 4
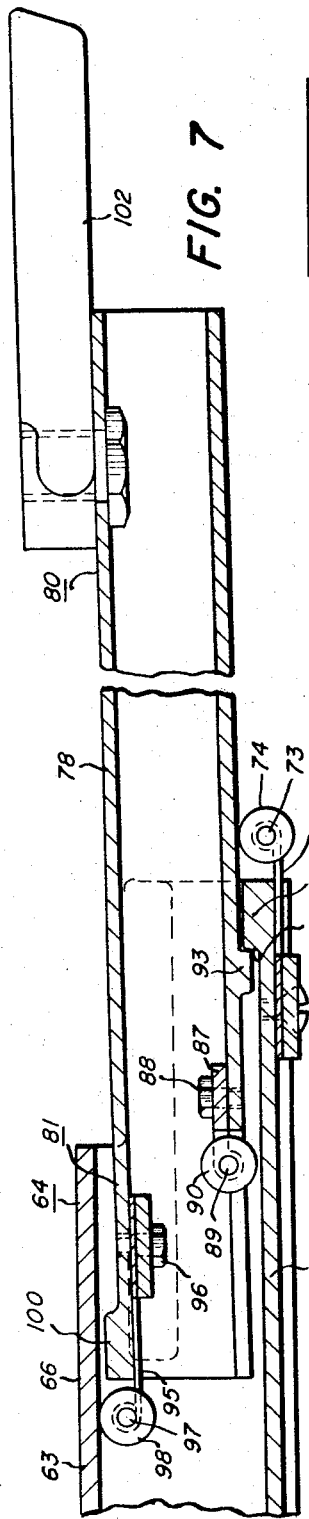
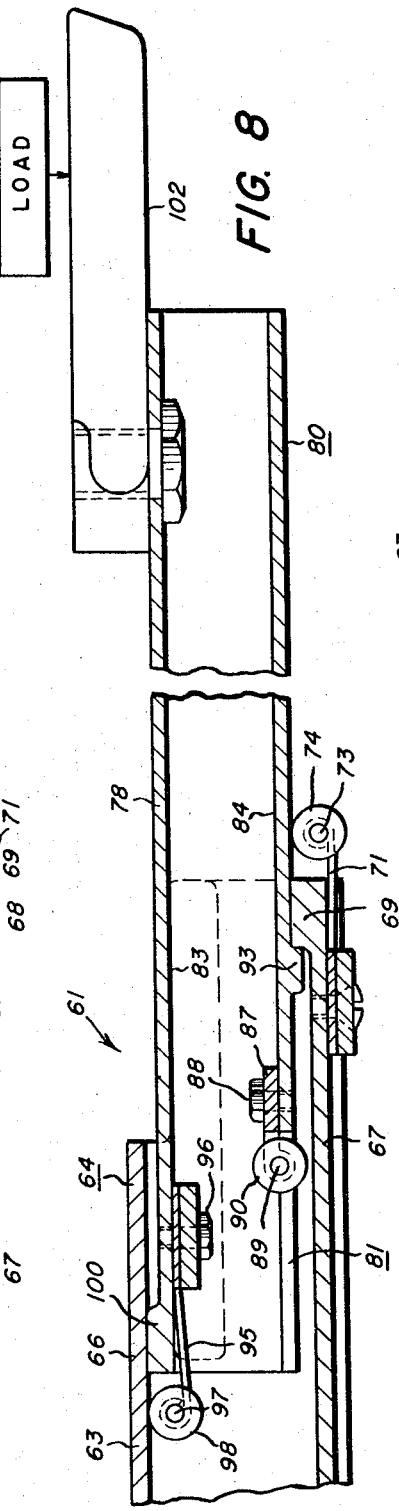
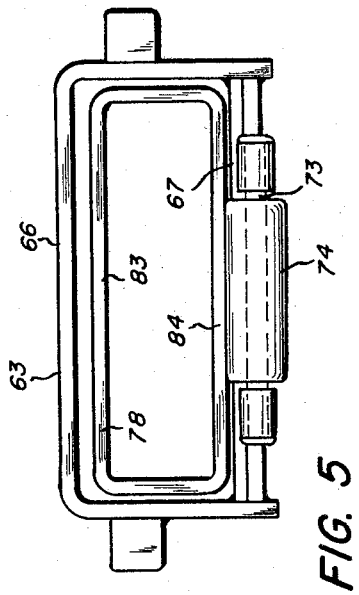
INVENTOR.
JAMES J. PELOUCH United States Patent Office 3,367,449
Patented Feb. 6, 1968

3,367,449
VEHICLE LIFT
James J. Pelouch, 7041 Hilton Road,
Brecksville, Ohio 44141
Continuation-in-part of application Ser. No. 570,871,
Aug. 8, 1966. This application June 8, 1967, Ser.
No. 644,721
9 Claims. (Cl. 187—8.75)

ABSTRACT OF THE DISCLOSURE

A single post vehicle lift with a cross beam connected intermediate its ends to a lifting piston and extending generally in the width direction of a vehicle to be lifted thereby. First and second vertical support members are attached to the ends of the cross beam and are of such a height that the upper ends thereof are spaced a substantial distance above the beam. Arms are provided on the upper end of each support member movable in a horizontal plane and each has a vehicle engaging portion. The upper ends of the vertical support members are spaced apart a distance slightly less than the width of the wheels of a vehicle to be raised and lowered whereby a vehicle can be driven over the vertical support members in their lower position and in the upper raised position a large access space to the bottom of the vehicle is provided by the deep yoke effect of the cross beam and the first and second vertical support members. The arms are provided with a roller supported telescoping member for and was entitled Vehicle Lift.

---

The present invention relates in general to vehicle lifts and more particularly to such a construction which is improved with respect to the superstructure.

This application is a continuation-in-part of United States patent application Ser. No. 570,871 which was filed Aug. 8, 1966 and was entitled Vehicle Lift, which in turn was a continuation of United States patent application Ser. No. 489,851 which was filed Sept. 24, 1965 and was entitled Vehicle Lift.

An object of the present invention is to provide a vehicle lift which is improved with respect to providing more working room underneath the vehicle.

Another object of the present invention is to provide a vehicle lift of the single post type which includes a single lifting piston connected to a single dropped transverse cross beam member with vertical support members connected to the opposite ends of the cross beam member with telescoping and swinging vehicle engaging members mounted on the tops of the vertical support members and with the tops of the vertical support members being spaced apart a distance which is slightly less than the width of the wheels of a vehicle to be raised and lowered by the lift.

Other objects and a fuller understanding of this invention may be had by referring to the following description and claims, taken in conjunction with the accompanying drawings, in which:

FIGURE 4 is a plan view of an improved swinging arm construction;

FIGURE 5 is a view taken along the line 5—5 of FIGURE 4;

FIGURE 6 is a view taken along the line 6—6 of FIGURE 4; and

FIGURES 7 and 8 show the telescoping part of the arm extended and respectively showing the arm unloaded and loaded.

Figure 1:
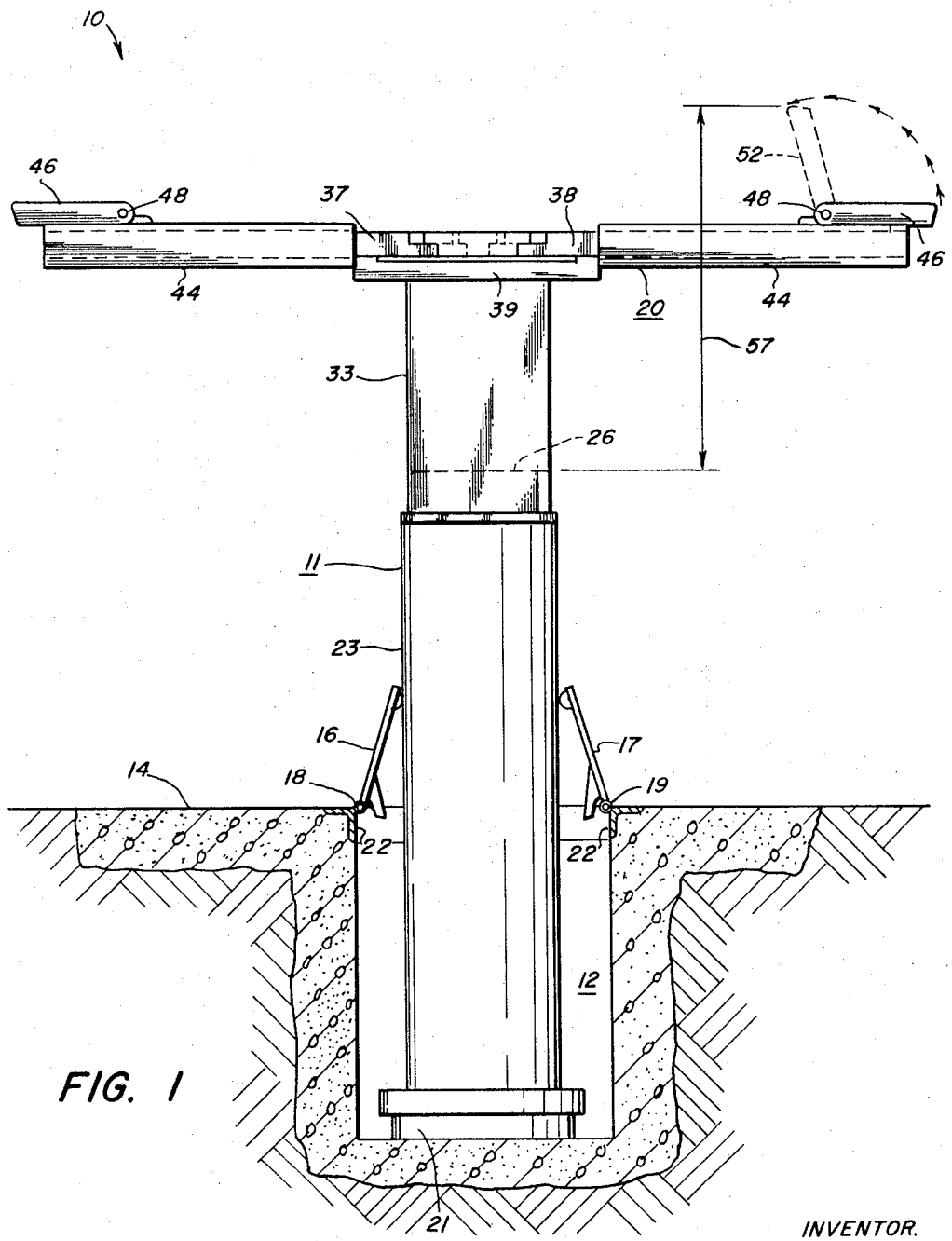
FIGURE 1 is an elevational view partially in section showing the overall construction of the vehicle lift of the present invention with the vehicle lift being shown in its raised position.
Figure 2:
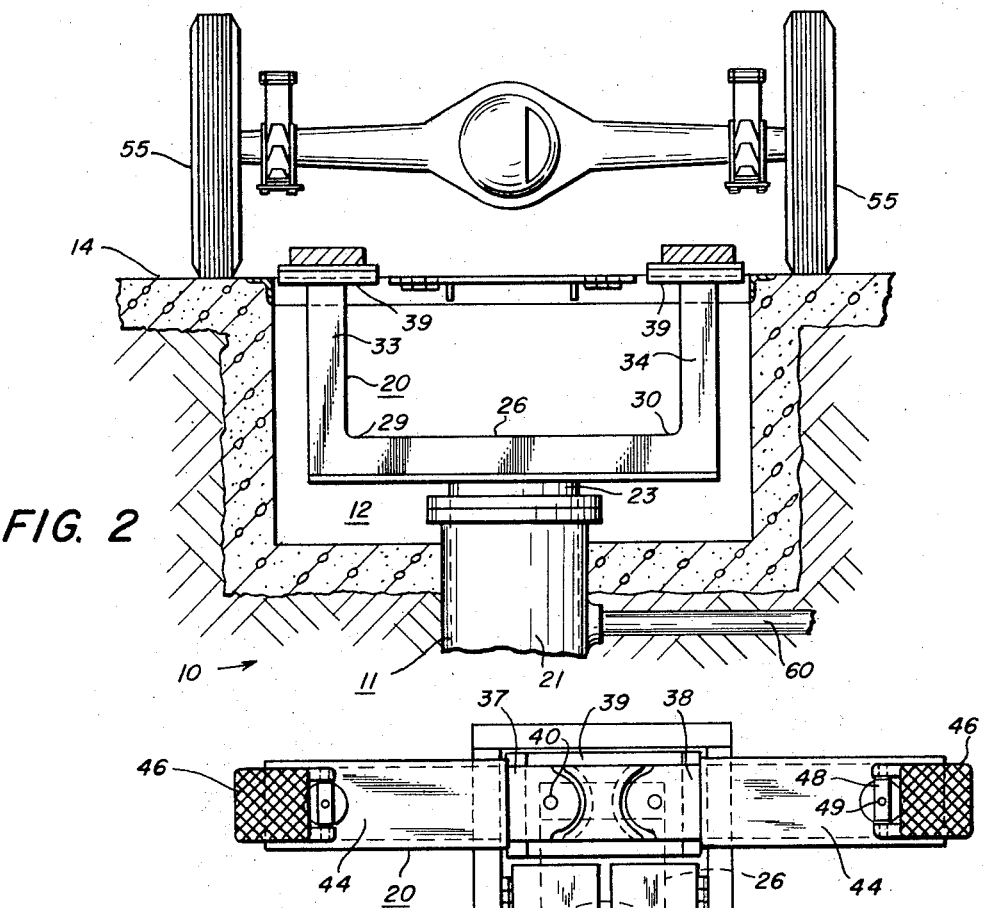
FIGURE 2 is an elevational view taken 90 degrees from the view of FIGURE 1 looking from the right end of FIGURE 1 and showing the vehicle lift in its lowered position.
Figure 3:
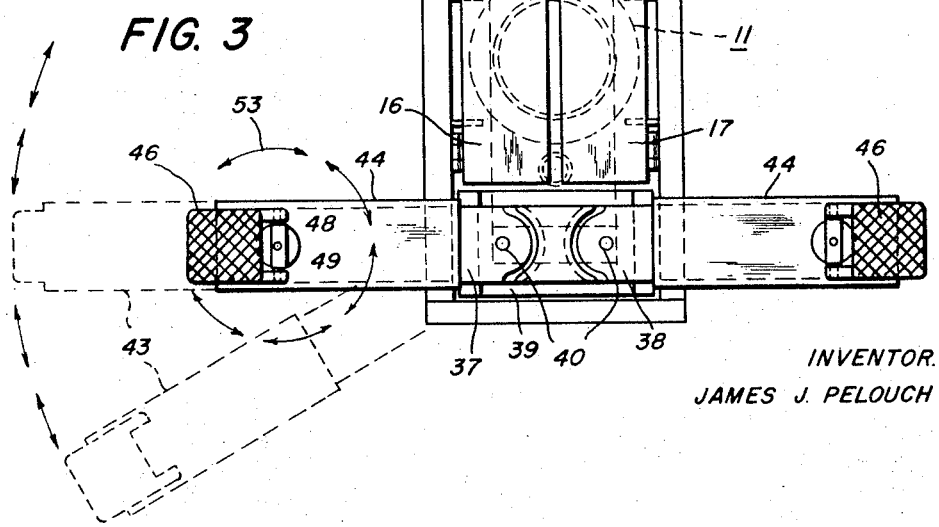
FIGURE 3 is a plan view of the vehicle lift and showing the lift in its lowered position.

The vehicle lift 10 of the present invention as shown in FIGURES 1, 2 and 3 includes what is commonly referred to in the art as the jack 11 which comprises primarily a piston 23 and cylinder 21 with the cylinder located within an enclosure or chamber 12 located below floor level 14. The length and width of the chamber or enclosure is best observed from FIGURES 1 and 2 of the drawings. The jack 11 is positioned generally centrally in the enclosure. It will be noted from FIGURES 1 and 2 that the piston in its raised position travels out of the enclosure to correspondingly raise and lower a superstructure 20 which is carried thereby. First and second doors 16 and 17 are connected by hinges 18 and 19 to channels 22 located at floor level and permanently secured to the concrete which forms the enclosure and the ends of these doors opposite the hinges are adapted to engage the piston to move the same to an open condition when the superstructure 20 is raised from the enclosure. When the piston and superstructure are lowered into the enclosure the doors fall closed by the action of gravity and assume the position shown in FIGURES 2 and 3. The doors 16 and 17 in their closed position are located substantially in the plane of the floor level.

The superstructure 20 includes a single cross or transverse beam 26 or equivalent structure which is provided with first and second ends 29 and 30 and the beam 26 is secured to the top of the piston 23 at a point intermediate the first and second ends 29 and 30. As best seen in FIGURE 2, the beam 26 extends substantially completely across this dimension of the enclosure 12. The beam extends generally at right angles to the extent of the piston and also at right angles to the direction of travel of the piston 23. First and second vertical support members 33 and 34 are attached to the first and second ends 29 and 30 respectively of the beam 26 and are of such a length as to place the upper ends of the support members 33 and 34 a substantial distance above the beam 26. A preferred minimum distance is on the order of 12 inches, as shown in the drawings, however, in many instances this distance should be substantially greater. First and second swinging arms 37 and 38 are swingably secured to the upper end of each of the vertical support members 33 and 34 by means of pivot members 40 extending through the swinging arms and into a plate 39 which is carried at the top of each support member 33 and 34. As illustrated in FIGURE 3, each of the swinging arms is adapted to pivot about the pivot members 40 and travels in a substantially horizontal plane. This is demonstrated in the dotted position 43 of FIGURE 3. Each of the swinging arms is provided with a telescoping portion 44 which generally slides over the arm and may be extended to increase the length of the arm as demonstrated by numeral 43 in FIGURE 3. A vehicle engaging pad 46 is provided on the end of each of the telescoping portions of the swinging arms and each pad is mounted for universal movement about a horizontal pivot 48 and a vertical pivot 49. The horizontal pivot enables the pad to be shifted to the position shown by the dotted line 52 in FIGURE 1 and the vertical pivot enables the pad to be swung through the positions illustrated by the arrows 53 in FIGURE 3. The vehicle engaging pads 46 are adapted to engage the frame of a vehicle to be handled by the vehicle lift. FIGURE 2 demonstrates the position of a vehicle relative to the superstructure and it will be noted here that the wheels 55 of the vehicle are located just outside the upper ends of the vertical support members 33 and 34 or in other words the upper ends of the support members are spaced apart a distance slightly less than the width of the wheels of a vehicle to be raised and lowered by the vehicle lift. The reason the tops of the vertical support members are so positioned with respect to the vehicle wheels is to enable the swinging arms with the pads to be positioned to engage the frame of the vehicle which is usually quite close to the vehicle wheels to be so positioned as not to obstruct most of the underside of the vehicle upon which mechanics usually wish to work. With the swinging arms and pads so located, it will be noted that the portion of the beam 26 which would normally obstruct a portion of the underside of the vehicle is located a substantial vertical distance below the underside of the vehicle for example in FIGURE 1 the distance demonstrated by the reference numeral 57 in the case of the pads 46 being located in their uppermost vertical position and a corresponding lesser distance of course when the pads are located flatwise with respect to the telescoping portion 44. The positioning therefor of the cross beam 26 in this manner leaves most of the underside of the vehicle unobstructed and enables a mechanic to work thereon much more conveniently.

In the lowered position of the vehicle lift it will be seen that the jack and most of the superstructure is located within the enclosure 12 and below floor level. Substantially the only portion above floor level is the swinging arms 37 and 38 which includes the telescoping portions 44 and the pads 46. However, when they are located in the position of FIGURE 3, they do not provide an obstruction to driving a vehicle into position vertically over the lift. The raising of the piston 23 is accomplished by introducing hydraulic fluid into the jack 11 through conduit 60 in a conventional manner.

FIGURES 4 through 8 illustrate an improved swinging arm construction for use with vehicle lifts and which may be particularly used with the lift shown in FIGURES 1 through 3. This construction is indicated generally by the reference numeral 61 and includes an arm 63 otherwise referred to as a first member which is provided with first and second end portions 64 and 65, respectively, and which has top and bottom walls 66 and 67 respectively. FIGURE 5 shows the cross sectional shape of the arm which is generally rectangular and defines an enclosure which includes the wall 66 and 67 and side walls which interconnect the ends of these two walls and which have been un-numbered. The first end portion of the enclosed arm is open. Wall means are provided on the bottom wall 67 and serve to define a stop shoulder 68 and a first pad support 69. A first spring 71 in the general nature of a leaf spring is secured to the bottom wall 67 by means of screws at one portion thereof and an opposite portion serves to carry an axle or pivot 73 which in turn supports a roller 74. It will be noted from FIGURE 6 that this roller 74 is normally carried by the spring action of spring 71 at a slightly higher vertical level than the top surface of the first pad support 69.

A telescoping member 78 is provided which has first and second end portions 80 and 81 respectively, as well as top and bottom walls 83 and 84 and this telescoping member is located within the above described enclosure for sliding movement in and out thereof to appropriately vary the reach of the swinging arm construction. A relatively rigid plate 87 is secured to the bottom wall 84 of the telescoping member by means of screws 88 and this plate serves to mount an axle or pivot 89 which in turn carries a roller 90. This roller 90 normally engages the bottom wall 67 of the arm 63 and because of its mounting is not capable of movement relative to the arm upon which it is secured. A stop member 93 is formed as a projection on the bottom wall 84 of the telescoping member 78 and is adapted for engagement with the stop shoulder 68 to limit outward telescoping movement of the telescoping member as seen in FIGURES 7 and 8.

A second spring 95 of the same construction as spring 71 is secured to the top wall 83 of the telescoping member by means of screws 96 and serves to resiliently or yieldingly support an axle or pivot 97 which serves to rotatively carry a roller 98 which is normally in engagement with top wall 66 of the arm 63. A second pad support 100 is carried by the top wall 83 of the telescoping member and is adapted to engage the top wall 66 of the arm 63.

A vehicle engaging pad 102 is carried by the first end portion of the telescoping member and is connected thereto by means of a pin 103 whereby the pad can be moved to various positions in a horizontal plane as demonstrated in FIGURE 4 and the pad 102 is also capable of being moved to a different vertical position as demonstrated in FIGURE 6.

The second end portion of the arm 63 is pivotally connected to a support 106 by way of a pivot 104 which extends through a boss 105. The support 106 is equivalent to the support members 33 and 34 seen in FIGURE 2. In addition to the pivot 104 the second end portion of the arm 63 is generally arcuately shaped as seen in the plan view of FIGURE 4 and in its angular movement is restrained from upward movement by means of a projection member 109. This construction is similar to that shown in FIGURE 3.

The function of the improved swinging arm construction is best understood from a review of FIGURES 6, 7 and 8. FIGURE 6 shows the telescoping member in completely retracted position without a load being exerted upon the pad 102. Under these conditions the telescoping member 78 is carried in the position shown by the spring supported rollers 74 and 98 as well as the fixedly positioned roller 90. Under these conditions the telescoping member is easily extended to the position shown in FIGURE 7 and the extreme outward movement is limited by engagement of the stop member 93 with the shoulder 68. In the position shown in FIGURE 7 the springs 71 and 95 are of sufficient strength to maintain the telescoping member as shown. FIGURE 8 shows this construction with a load applied to the pad 102 such as when the same is brought into contact with a vehicle part when the vehicle is being raised. Under these circumstances the springs 71 and 95 are of insufficient strength to withstand this force and they tend to retract as shown. By the same token the first pad support 69 comes into contact with the bottom wall of the telescoping member and the second pad support 100 comes into contact with the top wall of the arm and the assembly is held in fixed position so that the vehicle can be raised. As soon as the load is removed from the vehicle engaging pad the parts return to the position shown in FIGURE 7 whereat a workman can readily move the telescoping member 78 to the position desired. This construction is extremely advantageous in that the same can be moved quite readily to any desired position without an undue amount of effort.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A single post vehicle lift including in combination an enclosure located below floor level, only a single cylinder located in said enclosure, only a single piston located in said single cylinder and adapted for movement therein in a vertical direction between upper and lower positions, a beam having first and second ends and secured to said piston intermediate said first and second ends for travel therewith, said beam extending generally transverse to the extent of said piston, first and second vertical support members attached to said first and second ends of said beam respectively, said vertical support members being of such a height that the upper ends thereof are spaced a substantial distance above said beam, first and second adjustable arms mounted on the upper portion of each of said first and second vertical support members and adapted to be moved in a generally horizontal plane, each of said arms having a vehicle engaging portion, said upper potrions of said first and second vertical support members being spaced apart a distance slightly less than the width of the wheels of a vehicle to be raised and lowered by said vehicle lift whereby a vehicle can be driven over said beam, vertical support members and arms in their lowermost position without engaging same and with said upper ends of said support members being located just inside the width of the vehicle wheels in the lowermost position of said lift, said vehicle lift in its lowermost position locating said piston and beam in said encolsure whereby a vehicle may be driven into position over the lift.

2. A single post vehicle lift including in combination a box-like enclosure located below floor level, cover means for closing the top of said enclosure and when closed being substantially flush with the floor level, only a single cylinder located in said enclosure, only a single piston located in said single lift cylinder and adapted for movement therein in a vertical direction between upper and lower positions, only a single beam having first and second ends and secured to said piston intermediate said first and second ends for travel therewith, said beam extending generally at right angles to said piston, first and second vertical support members attached to said first and second ends of said beam respectively, said vertical support members being of such a height that the upper ends thereof are spaced a substantial distance above said beam, first and second swinging arms pivotally mounted on the upper end of each of said first and second vertical support members and adapted to swing about their respective pivotal mountings in a generally horizontal plane, each of said swinging arms having a telescoping portion for increasing the length thereof, a vehicle engaging pad carried on the end of each telescoping portion and adapted to engage the frame of a vehicle to be raised and lowered by said vehicle lift, said upper ends of said first and second vertical support members being spaced apart a given distance slightly less than the width of the wheels of a vehicle to be raised and lowered by said vehicle lift whereby a vehicle can be driven over said beam, vertical support members and arms in their lowermost position without engaging same and with said upper ends of said support members being located just inside the width of the vehicle wheels in the lowermost position of said lift, said vehicle lift in its lowermost position locating said piston, beam, and first and second support members in said enclosure with substantially only said swinging arms with said telescoping portions and pads above floor level.

3. A vehicle lift as claimed in claim 1 wherein each said vertical support member has a height which is at least on the order of forty percent of the length of said beam.

4. A vehicle lift as claimed in claim 2 wherein each said vertical support member has a height which is at least on the order of forty percent of the length of said beam.

5. A vehicle lift as claimed in claim 2 wherein each said arm has top and bottom walls and first and second end portions, each said telescoping portion having top and bottom walls and first and second end portions, each telescoping portion residing within a respective said arm and being longitudinally movable with respect thereto, first spring supported roller means carried by said arm at said first end portion thereof and engaging said bottom wall of said telescoping portion, second spring supported roller means carried by said telescoping portion at said second end portion thereof and engaging said top wall of said arm, said first and second spring supported roller means supporting said telescoping portion in its unloaded condition for ease in longitudinally moving the same, a first support means carried at said first end portion of said arm and engageable with said bottom wall of said telescoping portion, a second support means carried at said second end portion of said telescoping portion and engageable with said top wall of said arm, said first and second support means being in engagement respectively with said bottom wall of said telescoping portion and with said top wall of said arm in the loaded condition of said telescoping portion to support the same.

6. An arm construction for a vehicle lift including a first member having top and bottom walls and first and second end portions, a second member having top and bottom walls and first and second end portions, said second member residing within said first member and being longitudinally movable with respect thereto, said first end portion of said second member adapted to be loaded by engagement with a vehicle, first resiliently supported roller means carried by said first member at said first end portion thereof and engaging said bottom wall of said second member, second resiliently supported roller means carried by said second member at said second end portion thereof and engaging said top wall of said first member, said first and second resiliently supported roller means supporting said second member in its unloaded condition for ease in longitudinally moving same, a first support means carried at said first end portion of said first member and engageable with said bottom wall of said second member, a second support means carried at said second end portion of said second member and engageable with said top wall of said first member, said first and second support means being in engagement respectively with said bottom wall of said second member and with said top wall of said first member in the loaded condition of said second member to support the same.

7. An arm construction for a vehicle lift as claimed in claim 6 wherein said first and second resiliently supported roller means are spring supported.

8. An arm construction for a vehicle lift as claimed in claim 7 wherein said second end portion of said first member is pivotally connected to a support member.

9. An arm construction for a vehicle lift as claimed in claim 7 wherein a fixed axis roller is secured to said second end portion of said second member and rollingly engages said bottom wall of said first member in the unloaded condition of said second member.

References Cited
UNITED STATES PATENTS

| | | | |
|---|---|---|---|
| 2,654,443 | 10/1953 | Thompson | 187—8.41 |
| 2,658,586 | 11/1953 | Necker | 187—8.61 |
| 3,004,630 | 10/1961 | Clarke | 187—8.75 |
| 3,205,977 | 9/1965 | Goldzwig | 187—8.75 |

EVON C. BLUNK, *Primary Examiner.*

H. C. HORNSBY, *Assistant Examiner.*